(12) United States Patent
Ray et al.

(10) Patent No.: US 8,094,731 B2
(45) Date of Patent: Jan. 10, 2012

(54) SYSTEM AND METHOD FOR TRANSFERRING TELEMETRY DATA BETWEEN A GROUND STATION AND A CONTROL CENTER

(75) Inventors: Timothy J. Ray, Columbia, MD (US); Vuong T. Ly, Bethesda, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 505 days.

(21) Appl. No.: 12/357,081

(22) Filed: Jan. 21, 2009

(65) Prior Publication Data

US 2010/0183082 A1    Jul. 22, 2010

(51) Int. Cl.
*H04L 27/00* (2006.01)
(52) U.S. Cl. ............ 375/259; 455/3.02; 455/427; 701/1; 701/36
(58) Field of Classification Search .................. 375/259; 445/3.2, 427; 701/1, 36
See application file for complete search history.

(56) References Cited

U.S. PATENT DOCUMENTS

| | | | |
|---|---|---|---|
| 5,966,640 A | 10/1999 | Leath et al. | |
| 6,883,167 B1 * | 4/2005 | Szewerenko et al. | 717/162 |
| 7,365,674 B2 * | 4/2008 | Tillotson et al. | 342/26 B |
| 7,856,294 B2 * | 12/2010 | Van Gaasbeck et al. | 701/3 |
| 2004/0252053 A1 | 12/2004 | Harvey | |
| 2005/0218237 A1 | 10/2005 | Lapstun et al. | |
| 2005/0219299 A1 | 10/2005 | Silvebrook et al. | |
| 2005/0230487 A1 | 10/2005 | Lapstun et al. | |
| 2006/0052099 A1 | 3/2006 | Parker | |
| 2006/0209736 A1 | 9/2006 | Barnhart et al. | |
| 2006/0209737 A1 | 9/2006 | Barnhart et al. | |

* cited by examiner

*Primary Examiner* — Shuwang Liu
*Assistant Examiner* — Nader Bolourchi
(74) *Attorney, Agent, or Firm* — Heather Goo

(57) ABSTRACT

Disclosed herein are systems, computer-implemented methods, and tangible computer-readable media for coordinating communications between a ground station, a control center, and a spacecraft. The method receives a call to a simple, unified application programmer interface implementing communications protocols related to outer space, when instruction relates to receiving a command at the control center for the ground station generate an abstract message by agreeing upon a format for each type of abstract message with the ground station and using a set of message definitions to configure the command in the agreed upon format, encode the abstract message to generate an encoded message, and transfer the encoded message to the ground station, and perform similar actions when the instruction relates to receiving a second command as a second encoded message at the ground station from the control center and when the determined instruction type relates to transmitting information to the control center.

16 Claims, 8 Drawing Sheets

SYSTEM AND METHOD FOR TRANSFERRING TELEMETRY DATA BETWEEN A GROUND STATION AND A CONTROL CENTER

BACKGROUND OF THE INVENTION

1. Field of the Invention

The present invention relates to space-related communications and more specifically to communicating telemetry data in a standardized way between a ground station and a control center.

2. Introduction

To monitor the health and safety of spacecraft, a spacecraft must transmit spacecraft telemetry data to a ground station (such as a large antenna or a radio dish), a mission control center (such as those maintained by NASA, ESA, and FKA) must receive that telemetry data from the ground station, and the mission control center must be able to send commands and/or other information to the spacecraft through the ground station. The ground station and mission control center are often far from each other for logistical and other reasons. The criteria for an ideal ground station site, such as lack of interference and favorable weather, usually place ground stations in remote locations like New Norcia, Australia, and Kaena Point, Hi. Housing, education, and other human-resource related needs of the extensive staff of a mission control center make such remote locations impractical for mission control centers. Thus, the current practice is to place the ground station and mission control center in respectively well-suited locations and establish a communication link between the two.

In the past, each space mission implemented custom data communication designs and protocols to communicate between the spacecraft, ground station, and mission control center. As the number of space missions and spacecraft rose, so did the number of incompatible communication protocols. Communication required numerous translation and interpretation modules to bridge these incompatibilities. These extra translation and interpretation modules are not perfect and can introduce delays or errors into communication with spacecraft. The Consultative Committee for Space Data Systems (CCSDS) developed Space Link Extension (SLE) services to standardize the interfaces and enable ground stations and mission control centers across different national and international space agencies to interoperate without the need for ad hoc custom data communications designs.

Software libraries exist which implement SLE, but users must access them through an overly cumbersome and complex interface. For example, the existing SLE Return Channel Frames libraries define over 1,000 interface routines. Accordingly, what is needed in the art is a simplified, streamlined, unified way to coordinate communication between spacecraft, ground stations, and control centers.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods, and tangible computer readable-media for coordinating communications between a ground station, a control center, and a spacecraft. The method includes receiving instructions as a call and arguments to a simple, unified application programmer interface implementing communications protocols related to outer space, determining an instruction type of the received instructions, when the determined instruction type relates to receiving a first command at the control center for the ground station (1) translate the first command to generate a first abstract message by agreeing upon a format for each type of abstract message with the ground station and using a discrete set of abstract message definitions to configure the first command in the agreed upon format, (2) encode the first abstract message using an encoding layer to generate a first encoded message, and (3) transfer the first encoded message to the ground station using a transport mapping layer, and perform similar actions when the determined instruction type relates to receiving a second command as a second encoded message at the ground station from the control center and when the determined instruction type relates to transmitting information to the control center, the information being received at the ground station from the spacecraft.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
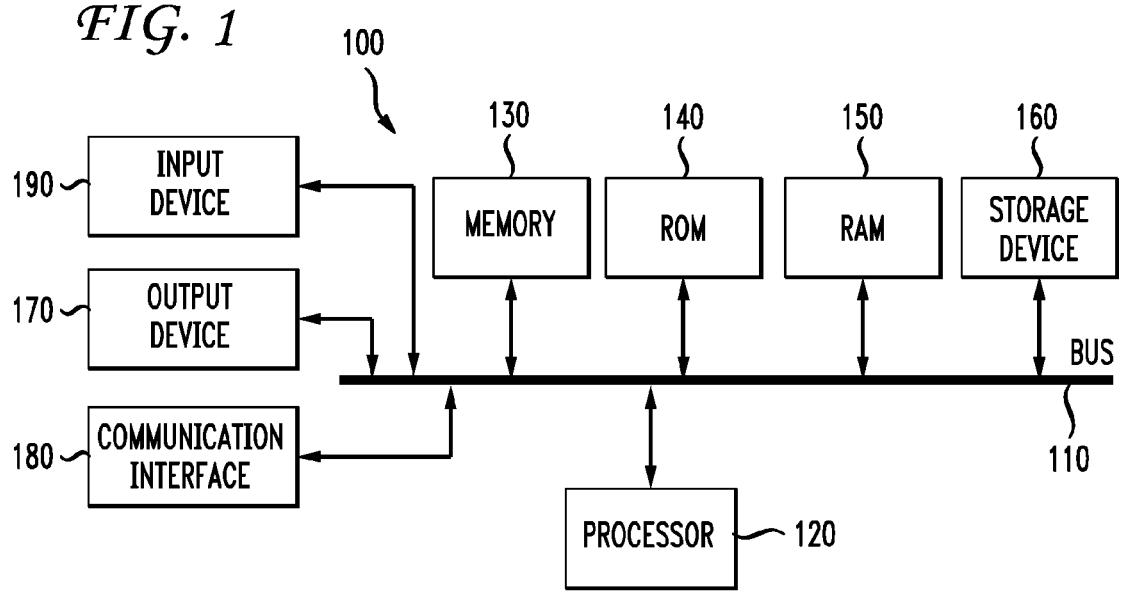
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. An Intel Xeon LV L7345 processor is an example of a general purpose CPU which is controlled by software. Particular functionality may also be built into the design of a separate computer chip. A STMicroelectronics STA013 processor is an example of a special-purpose processor which decodes MP3 audio files. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
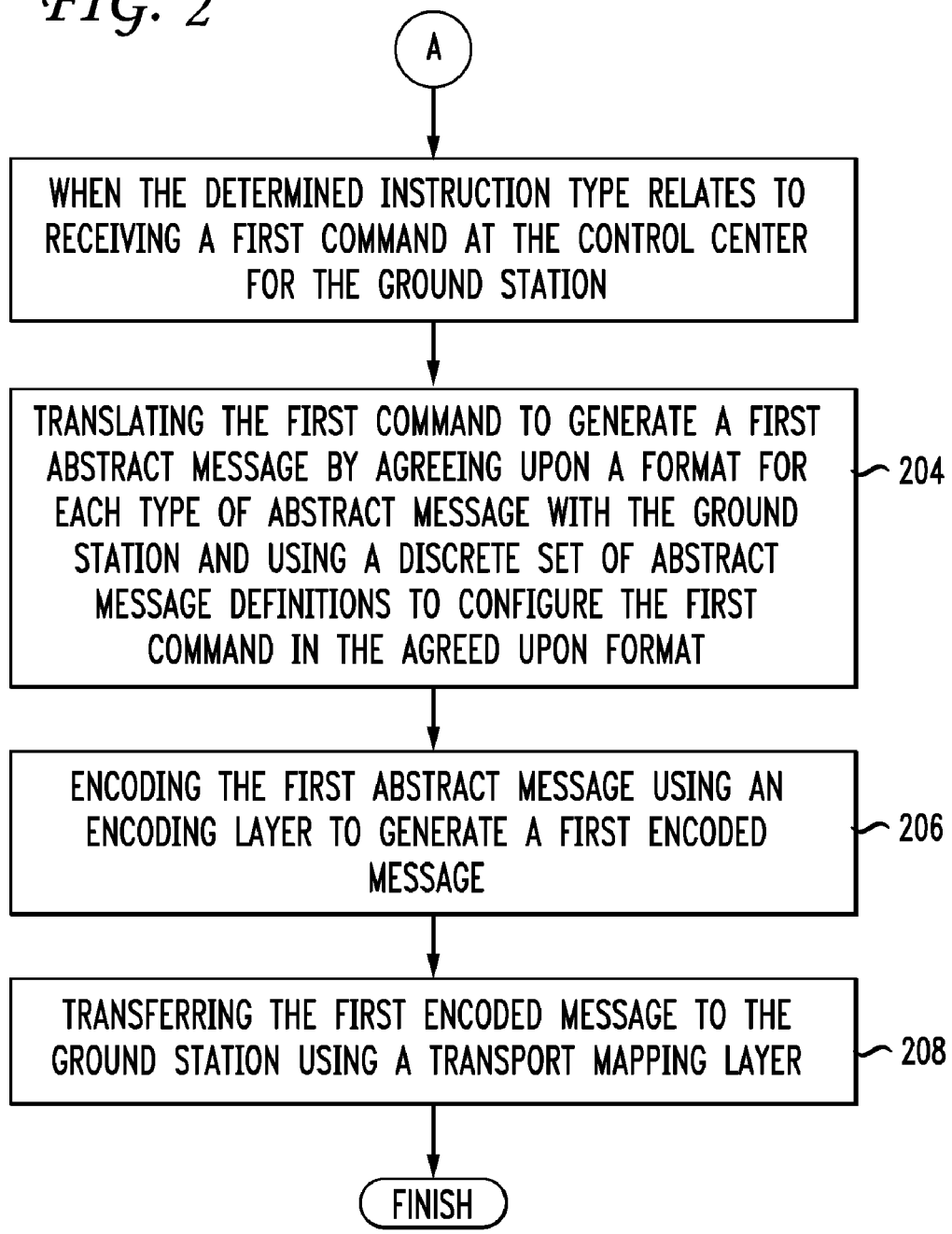
FIG. 2 illustrates an example method embodiment for controlling a ground station.

Having discussed the basic elements of a system configured to practice the invention, the disclosure turns to the exemplary method embodiment. The method embodiment is split into three distinct functionalities which can be implemented together as a unified software library, or application programmer interface (API). The disclosure discusses the method in terms of the above-described system configured to practice the method. FIG. 2 illustrates an example method embodiment for controlling a ground station when the determined instruction type relates to receiving a first command at the control center for the ground station. The command can include control center credentials. The system can incorporate credentials automatically into the command or as directed by a user. Credentials can include cryptographic keys, such as those used in PGP. Credentials can serve as a signature or a unique identification that the command is from a proper source.

The system translates the first command to generate a first abstract message by agreeing upon a format for each type of abstract message with the ground station and using a discrete set of abstract message definitions to configure the first command in the agreed upon format (204). The system can incorporate Space Link Extension (SLE) protocols when dealing with abstract messages. Some aspects of SLE protocols include SLE Return Channel Frames (SLE-RCF) and SLE Forward Command Link Transmission Unit (SLE-Forward CLTU), each of which encompasses specific sets of functionality. The abstraction layer can interoperate with a variety of encoding layers and transport mapping layers, allowing for a simple and unified interface. The system encodes the first abstract message using an encoding layer to generate a first encoded message (206). When encoding the abstract message, the system can also convert the abstract message to a binary format. The system transfers the first encoded message to the ground station using a transport mapping layer (208). Transmission Control Protocol/Internet Protocol (TCP/IP) is the de facto standard for the transport mapping layer, but the system can use other transport mapping layers such as User Datagram Protocol (UDP) or Internetwork Packet Exchange/

Sequenced Packet Exchange (IPX/SPX), for example. The transport mapping layer can operate in one of three modes. The first is a timely online delivery mode. The second is a complete online delivery mode also using an online frame buffer. The third is an offline delivery mode also using an offline frame buffer. Each of these three modes are depicted and discussed in more detail in FIG. 8.

The user interface for the system can operate under either event-driven approach or a polled approach. An event-driven interface controls the program flow based on input from a user, from sensors, from other threads, etc. A polled approach calls certain routines at set intervals to check for updates or tasks.

Figure 3:
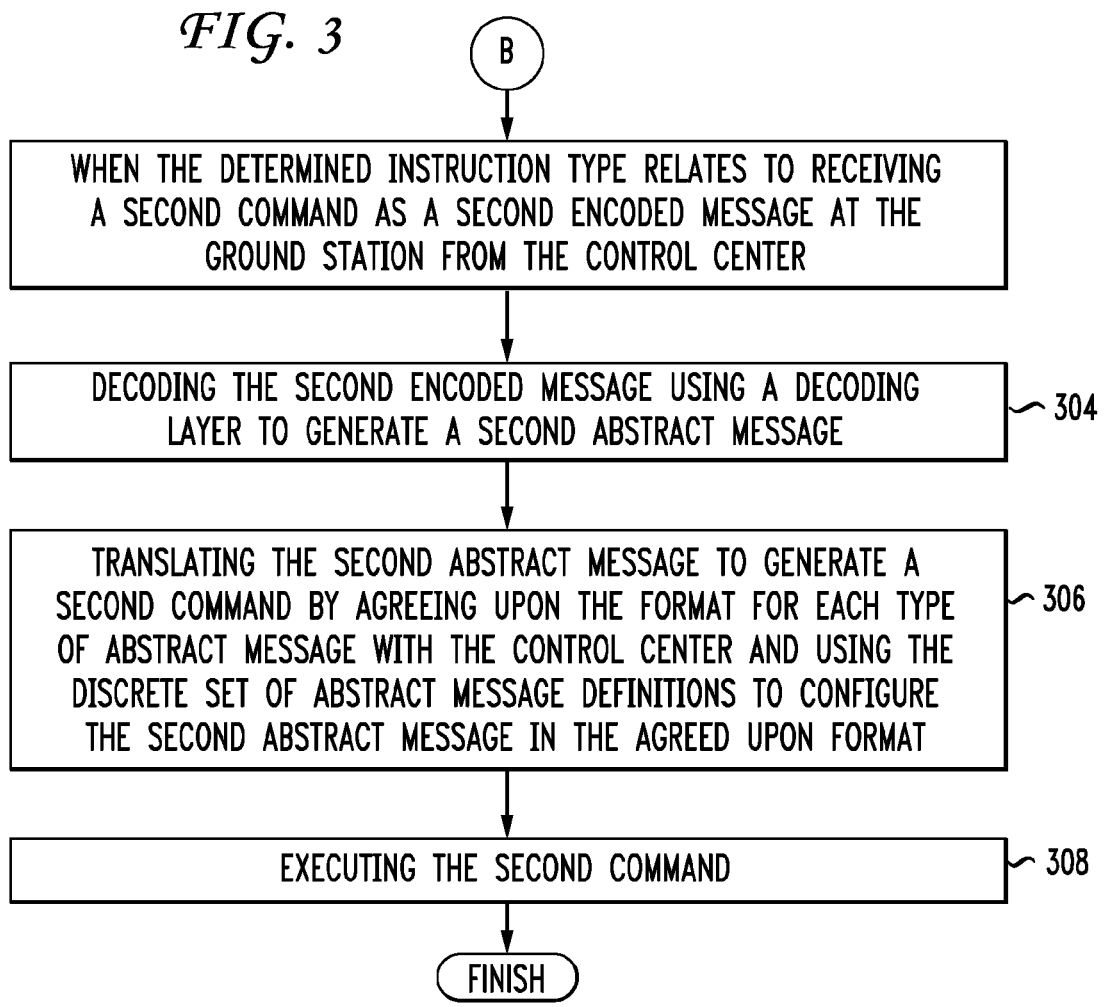
FIG. 3 illustrates an example method embodiment for executing received commands at a ground station.

FIG. 3 illustrates an example method embodiment for executing commands when the determined instruction type relates to receiving a second command as a second encoded message at the ground station from the control center. The system decodes the second encoded message using a decoding layer to generate a second abstract message (304). The decoding layer can convert the encoded message from a binary format. The system translates the second abstract message to generate a second command by agreeing upon the format for each type of abstract message with the control center and using the discrete set of abstract message definitions to configure the second abstract message in the agreed upon format (306). The abstraction layer can interoperate with a variety of encoding layers. In this way, one unified interface can accept messages and commands generated by multiple encoding schemes. The system executes the second command (308). The system can optionally transmit to the control center an acknowledgment of receipt of the encoded message, a notice of success, and/or a notice of failure of executing the command. For example, if a command was issued to order the spacecraft to change course and the spacecraft did not respond, then the system can notify the control center that the command failed to execute.

The command can include control center credentials. In this case, the system can execute the command only after successful authentication of the control center credentials. The user interface for the system can be either event-driven approach or a polled approach. An event-driven interface controls the program flow based on input from a user, from sensors, from other threads, etc. A polled approach calls certain routines at set intervals to check for updates or tasks.

Figure 4:
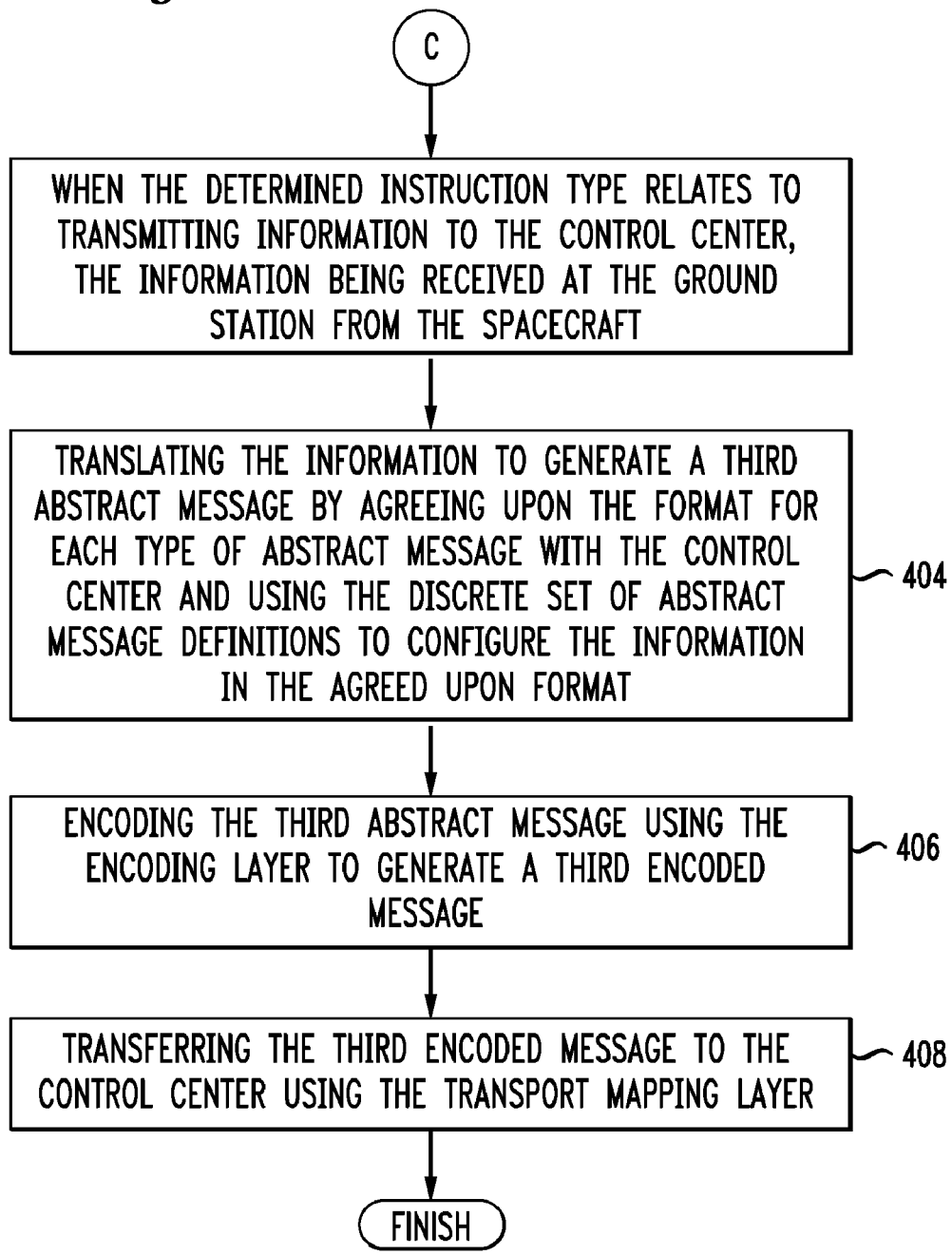
FIG. 4 illustrates an example method embodiment for relaying information from a spacecraft to a control center.

FIG. 4 illustrates an example method embodiment for when the determined instruction type relates to transmitting information to the control center, the information being received at the ground station from the spacecraft. The information can be a spacecraft telemetry (TM) transfer frame or an acquired of signal (AOS) transfer frame. The system translates the information to generate a third abstract message by agreeing upon the format for each type of abstract message with the control center and using the discrete set of abstract message definitions to configure the information in the agreed upon format (404). The abstraction layer can interoperate with a variety of encoding layers. In this way, one unified interface can accept messages and commands generated by multiple encoding schemes. The system encodes the third abstract message using the encoding layer to generate a third encoded message (406). The encoder can convert the abstract message to a binary format. The system transfers the third encoded message to the control center using the transport mapping layer (408). The system can transfer the encoded message using a transfer buffer in one of the following modes: a timely online delivery mode, a complete online delivery mode also using an online frame buffer, and an offline delivery mode also using an offline frame buffer. The user interface for the system can be either event-driven approach or a polled approach. An event-driven interface controls the program flow based on input from a user, from sensors, from other threads, etc. A polled approach calls certain routines at set intervals to check for updates or tasks.

Figure 5:
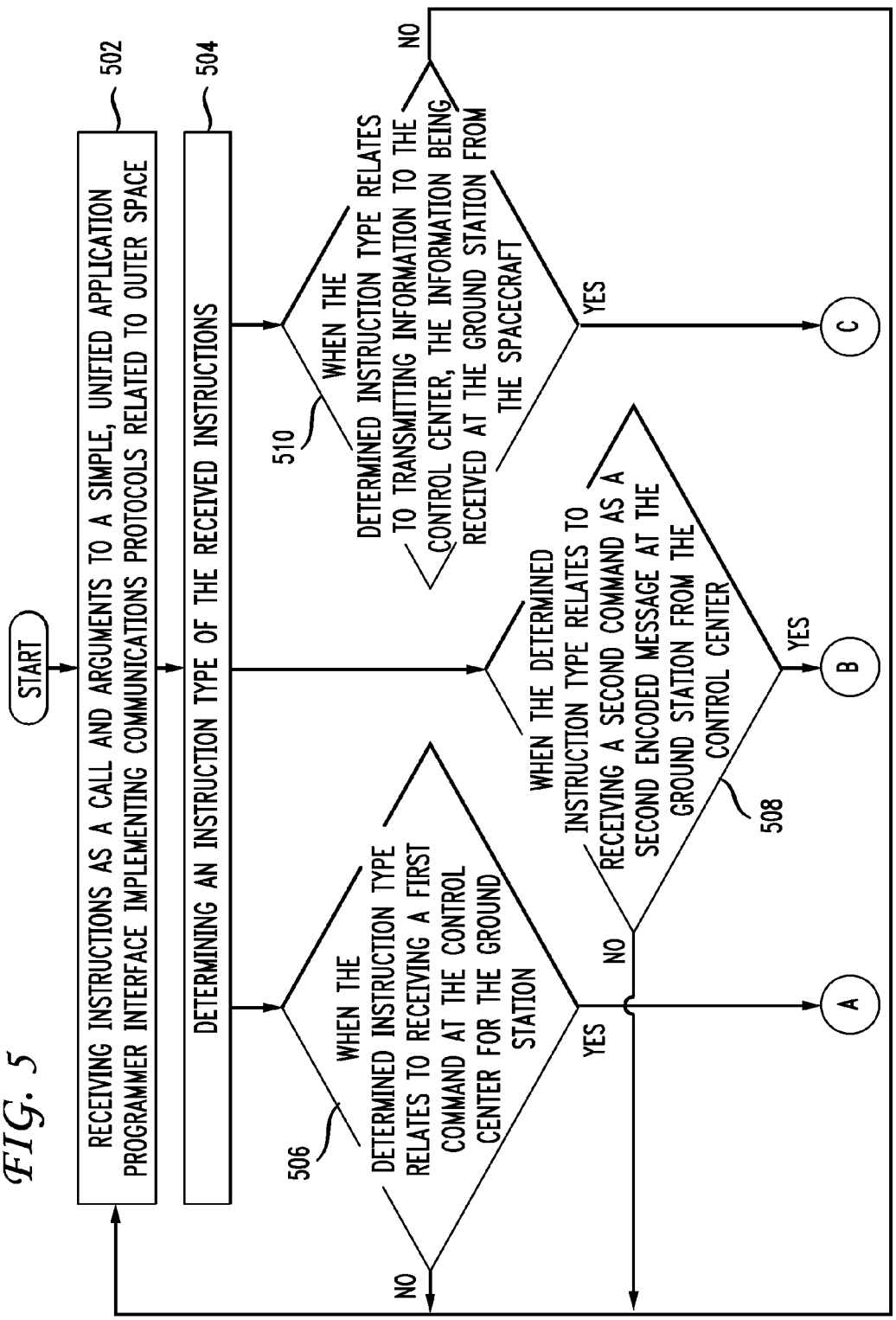
FIG. 5 illustrates an example method embodiment combining FIGS. 2-4.

FIG. 5 illustrates an example method embodiment combining and linking FIGS. 2-4. For clarity, the method is discussed in the context of a system configured to practice the method. The system first receives instructions as a call and arguments to a simple, unified application programmer interface implementing communications protocols related to outer space (502). The communications protocols related to outer space can include Space Link Extension—Return Channel Frames (SLE-RCF) protocol and Space Link Extension—Forward Command Link Transmission Unit (SLE-Forward CLTU) protocol. The system determines an instruction type of the received instructions (504). When the determined instruction type relates to receiving a first command at the control center for the ground station, the system follows the method as shown in FIG. 2 (506). When the determined instruction type relates to receiving a second command as a second encoded message at the ground station from the control center, the system follows the method as shown in FIG. 3 (508). When the determined instruction type relates to transmitting information to the control center, the information being received at the ground station from the spacecraft, the system follows the method as shown in FIG. 4 (510). If the determined instruction type does not fall into any of those three categories, the system can return to the beginning.

Figure 6:
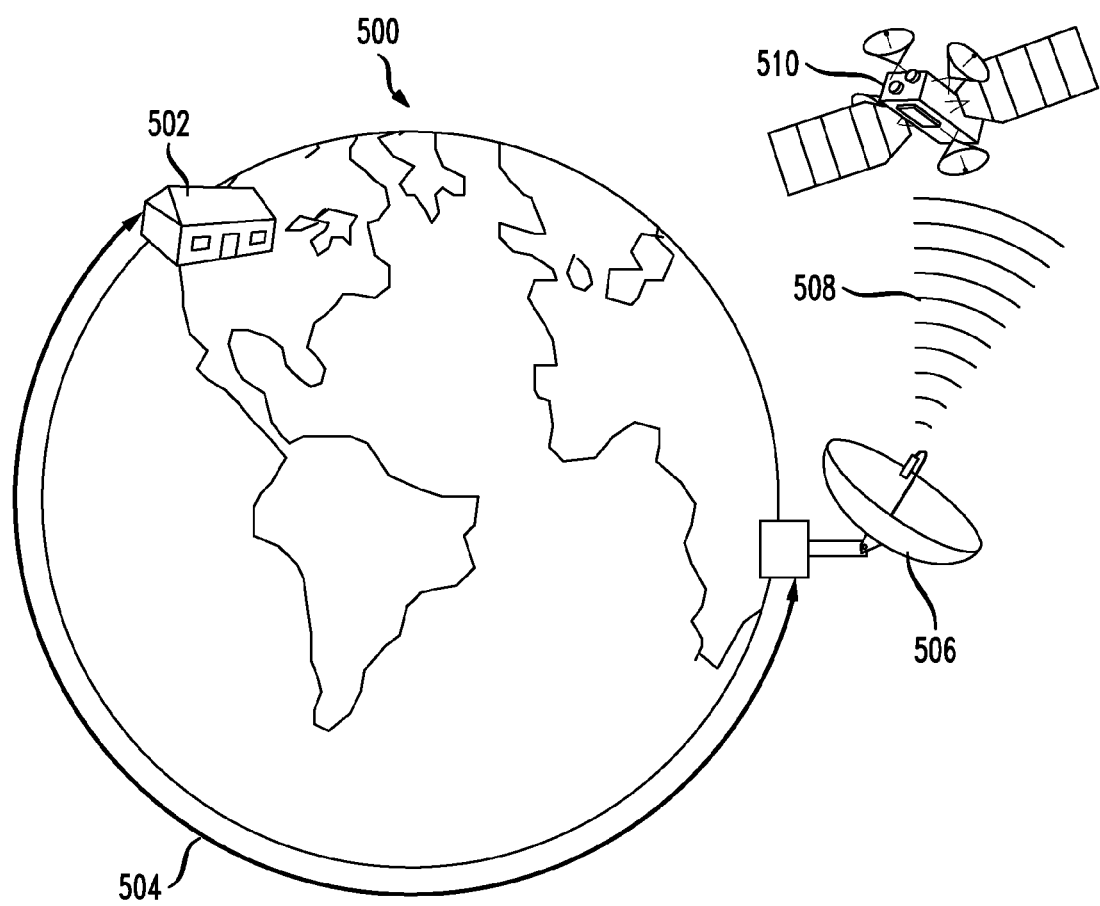
FIG. 6 illustrates a communication flow between a control center, a ground station, and a spacecraft.

FIG. 6 illustrates a communication flow between a control center, a ground station, and a spacecraft. The region depicted is the Earth and the space surrounding the Earth within communications distance 600. The control center 602 is located on one continent. The control center communicates via a network connection 604 with the ground station 606. The ground station is located on another continent halfway around the Earth. These facilities are constructed so far away from each other for many reasons. For example, the ground station may be in one location because of optimal weather, optimal latitude, minimal radio interference, etc. The control center may be in another location because of telecommunication infrastructure, nearby experts and specialists, cost of land, and/or other infrastructural needs. The network connection can be over the Internet, a dedicated connection (such as Ethernet, fiber optic cable, coaxial cable, wireless, etc.), or a blend.

The ground station 606 has a one-way or two-way link 608 with a spacecraft 610 such as a satellite, a space shuttle, a space station, a rocket, a telescope, etc. The link can be one-way in either direction, but it is more likely to be a two-way link. The control center 602 can issue commands and/or information to the ground station 606 which relays those commands and/or information to the spacecraft 610. Conversely, the spacecraft 610 can send information (such as telemetry information) to the ground station 606, which relays that information to the control center 602.

Figure 7:
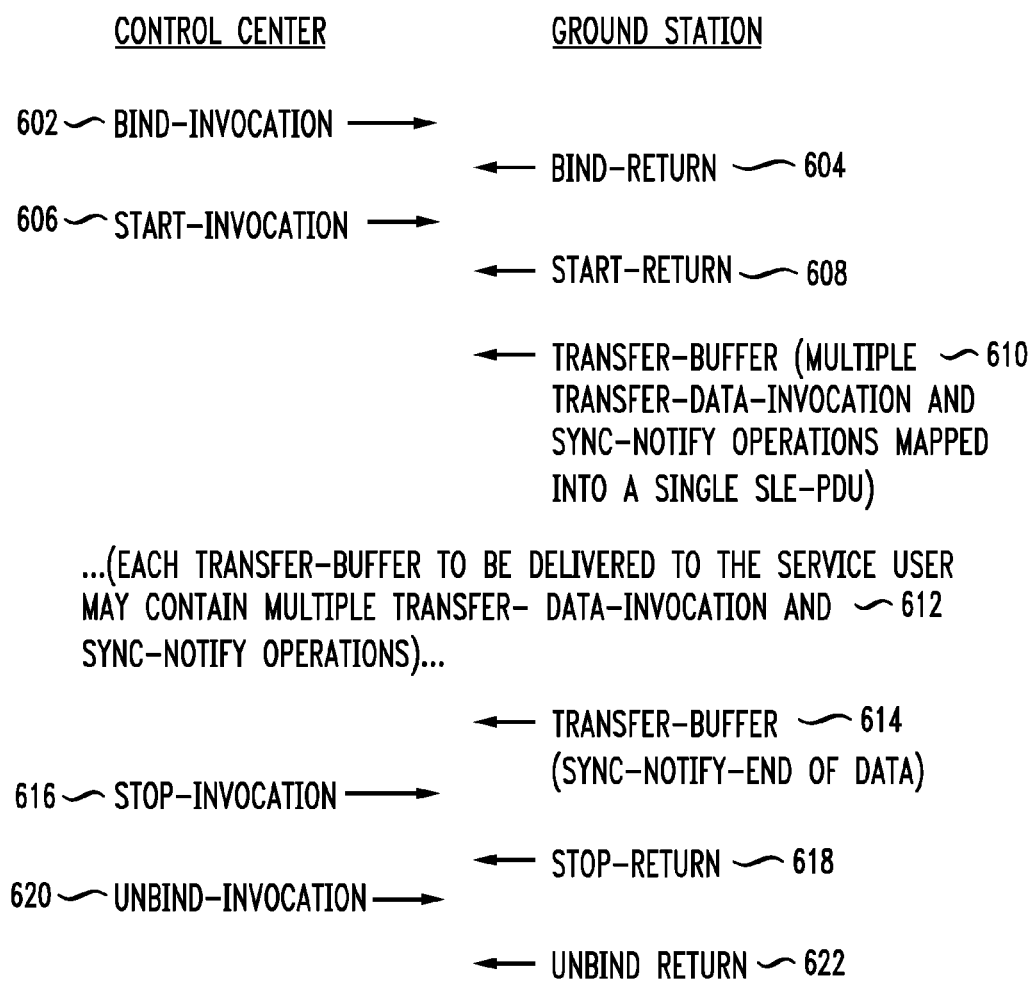
FIG. 7 illustrates an example step-by-step interaction between a control center and a ground station.

FIG. 7 illustrates an example step-by-step interaction between a control center and a ground station. The term Invocation 702, 706, 716, 720 refers to the initial message, and the term Return 704, 708, 718, 722 refers to the response to the message, either positive or negative. The control center establishes a session 702, 706 and the ground station acknowledges 704, 708. Session establishment can include two operations: Bind and Start. The ground station transfer buffer sends information 710, 712 such as telemetry frames to the control center. The transfer of each data block can include one operation: Transfer-Data. The ground station sends a notification 714 to the control center that it is finished sending information. The control center then stops the transmission and terminates the connection 716, 720. The ground station acknowledges that the transmission is stopped and the connection is terminated 718, 722. Breaking a session can include two operations: Stop and Unbind.

A state-based protocol can govern interactions between the control center and the ground station. Some main states in such a state-based protocol include Unbound (no connection is established), Bound (a connection is established, but the ground station is not permitted to send data blocks), and Started (a connection is established and the ground station can send data blocks). Under such a state-based protocol, the system uses messages to accomplish the above operations. Some core messages are Bind 702, 704, Start 706, 708, Transfer-Data 710, 712, 714, Stop 716, 718, and Unbind 720, 722.

The control center sends each of the core messages with the exception of Transfer-Data and can require a response from the ground station (i.e. an ack or nak, which are short for acknowledged or not acknowledged). With the exception of Transfer-Data where the ground station provides no Return message, a positive Return from the Provider indicates successful completion of the requested operation. Each Transfer-Data message can contain one telemetry frame. To maximize the usefulness of the data delivered from the ground station to the control center, the system can use one of the buffering mechanisms depicted in FIG. 7 and map multiple Transfer-Data messages into a single protocol data unit. The control center and ground station determine the size of the protocol data unit in advance. In addition to the Transfer-Data message, the ground station can also send a Sync-Notify message to notify the control center of an event affecting the connection, such as an interruption in frame delivery or a change in production status. Each Sync-Notify message can convey one event from the ground station to the control center. When the control center receives all the frames, the ground station invokes the Sync-Notify operation to provide an 'end-of-data' notification 714.

This interaction is exemplary; other interactions are possible. For example, if either the control center or the ground station detects a protocol violation from the other (such as one partner not responding to repeated attempts to establish communication), it aborts the session by issuing a Peer-Abort message and disconnecting. The outcome is the same regardless of which one issues the Peer-Abort message. The session is over, the connection is dropped, and the control center must establish a new session in order to continue communication. As another example, if the ground station experiences a service outage, it can alert a connected control center of the outage by sending a Sync-Notify message indicating the severity of the outage (Interrupted or Halted). When the service outage is over and the ground station can resume operations, the ground station sends the connected control center a Sync-Notify message indicating that it is operational.

Figure 8:
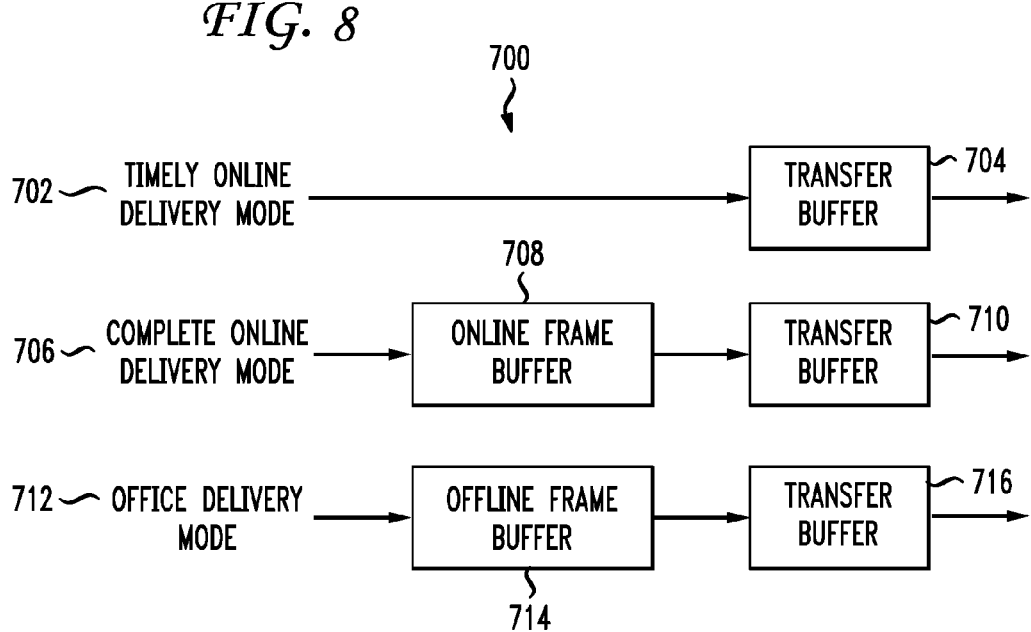
FIG. 8 illustrates three example data delivery modes.

FIG. 8 illustrates three example data delivery modes 800. In the timely online delivery mode 802 the system stores telemetry frames and synchronous notifications in the transfer buffer 804. The system releases the data when the transfer buffer 804 is full or the release timer expires. If the system cannot pass data to the communications service, the system discards the entire transfer buffer 804. In the complete online delivery mode 806, the system holds data in the online frame buffer 808, rather than discarding the data, when it can not deliver the data to the transfer buffer 810 for a significant period of time. The online frame buffer 808 can be large enough to hold all the data for one space link session. In the offline delivery mode 812, the offline frame buffer 814 can be large enough to hold all the data for several space link sessions.

One of the main advantages over the prior art is the simplicity. With the encoding layer and abstraction layer, a system can efficiently run a control center task in as little as a single thread, where existing implementations are much more bloated and wasteful. One existing software library defines over 1,000 interface routines, where less than 30 routines are needed to perform the same task based on the principles disclosed herein. Some other related advantages are ease of use, ease of maintenance, improved reliability, and improved performance. The methods described herein can be implemented as a software library allowing other software developers easy, simple, and unified API access to needed functionality.

Embodiments within the scope of the present invention may also include tangible computer-readable media for carrying or having computer-executable instructions or data structures stored thereon. Such tangible computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein may be applied to extra-planetary control centers and ground stations. Those skilled in the art will readily recognize various modifications and changes that may be made to the present invention without following the example embodiments and applications illustrated and described herein, and without departing from the true spirit and scope of the present invention.

We claim:

1. A non-transitory computer-readable medium storing instructions for coordinating communications between a ground station, a control center, and a spacecraft, the instructions comprising:
   receiving instructions as a call and arguments to a simple, unified application programmer interface implementing communications protocols related to outer space;
   determining an instruction type of the received instructions;
   when the determined instruction type relates to receiving a first command at the control center for the ground station:
      (1) translating the first command to generate a first abstract message by agreeing upon a format for each type of abstract message with the ground station and using a discrete set of abstract message definitions to configure the first command in the agreed upon format;
      (2) encoding the first abstract message using an encoding layer to generate a first encoded message;
      (3) transferring the first encoded message to the ground station using a transport mapping layer;
   when the determined instruction type relates to receiving a second command as a second encoded message at the ground station from the control center:
      (1) decoding the second encoded message using a decoding layer to generate a second abstract message;
      (2) translating the second abstract message to generate a second command by agreeing upon the format for each type of abstract message with the control center and using the discrete set of abstract message definitions to configure the second abstract message in the agreed upon format;
      (3) executing the second command;
   when the determined instruction type relates to transmitting information to the control center, the information being received at the ground station from the spacecraft:
      (1) translating the information to generate a third abstract message by agreeing upon the format for each type of abstract message with the control center and using the discrete set of abstract message definitions to configure the information in the agreed upon format;
      (2) encoding the third abstract message using the encoding layer to generate a third encoded message; and
      (3) transferring the third encoded message to the control center using the transport mapping layer.

2. The non-transitory computer-readable medium of claim 1, wherein commands include credentials which must be verified before execution.

3. The non-transitory computer-readable medium of claim 1, wherein encoded messages are transferred using a transfer buffer in one of a timely online delivery mode, a complete online delivery mode also using an online frame buffer, and an offline delivery mode also using an offline frame buffer.

4. The non-transitory computer-readable medium of claim 1, wherein the information is a spacecraft telemetry (TM) transfer frame.

5. The non-transitory computer-readable medium of claim 1, when receiving a command as an encoded message at a ground station from a control center, the method further comprising transmitting to the control center a command execution notice.

6. The non-transitory computer-readable medium of claim 1, wherein abstract messages can interoperate with a variety of encoding layers and transport mapping layers.

7. The non-transitory computer-readable medium of claim 1, wherein the communications protocols related to outer space comprise Space Link Extension-Return Channel Frames (SLE-RCF) protocol and Space Link Extension-Forward Command Link Transmission Unit (SLE-Forward CLTU) protocol.

8. The non-transitory computer-readable medium of claim 1, wherein the communications protocols related to outer space comprise Space Link Extension-Return Channel Frames (SLE-RCF) protocol and Space Link Extension-Forward Command Link Transmission Unit (SLE-Forward CLTU) protocol.

9. A method of coordinating communications between a ground station, a control center, and a spacecraft, the method comprising:
   receiving instructions as a call and arguments to a simple, unified application programmer interface implementing communications protocols related to outer space;
   determining an instruction type of the received instructions;
   when the determined instruction type relates to receiving a first command at the control center for the ground station:
      (1) translating the first command to generate a first abstract message by agreeing upon a format for each type of abstract message with the ground station and using a discrete set of abstract message definitions to configure the first command in the agreed upon format;
      (2) encoding the first abstract message using an encoding layer to generate a first encoded message;
      (3) transferring the first encoded message to the ground station using a transport mapping layer;
   when the determined instruction type relates to receiving a second command as a second encoded message at the ground station from the control center:
      (1) decoding the second encoded message using a decoding layer to generate a second abstract message;
      (2) translating the second abstract message to generate a second command by agreeing upon the format for each type of abstract message with the control center and using the discrete set of abstract message definitions to configure the second abstract message in the agreed upon format;
      (3) executing the second command;
   when the determined instruction type relates to transmitting information to the control center, the information being received at the ground station from the spacecraft:
      (1) translating the information to generate a third abstract message by agreeing upon the format for each type of abstract message with the control center and using the discrete set of abstract message definitions to configure the information in the agreed upon format;

(2) encoding the third abstract message using the encoding layer to generate a third encoded message; and
(3) transferring the third encoded message to the control center using the transport mapping layer.

10. The method of claim 9, wherein one of an event-driven approach and a polled approach is used.

11. The method of claim 9, wherein commands include credentials which must be verified before execution.

12. The method of claim 9, wherein encoded messages are transferred using a transfer buffer in one of a timely online delivery mode, a complete online delivery mode also using an online frame buffer, and an offline delivery mode also using an offline frame buffer.

13. The method of claim 9, wherein the information is a spacecraft telemetry (TM) transfer frame.

14. The method of claim 9, when receiving a command as an encoded message at a ground station from a control center, the method further comprising transmitting to the control center a command execution notice.

15. The method of claim 9, wherein abstract messages can interoperate with a variety of encoding layers and transport mapping layers.

16. The method of claim 9, wherein the communications protocols related to outer space comprise Space Link Extension-Return Channel Frames (SLE-RCF) protocol and Space Link Extension-Forward Command Link Transmission Unit (SLE-Forward CLTU) protocol.

* * * * *